(12) United States Patent
Kim

(10) Patent No.: US 9,019,128 B1
(45) Date of Patent: Apr. 28, 2015

(54) AUGMENTED REALITY AIRCRAFT MANAGEMENT SYSTEM

(71) Applicant: The Boeing Company, Chicago, IL (US)

(72) Inventor: Guen Il Kim, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 13/898,686

(22) Filed: May 21, 2013

(51) Int. Cl.
*G08B 21/00* (2006.01)
*G01C 23/00* (2006.01)

(52) U.S. Cl.
CPC .................................... *G01C 23/00* (2013.01)

(58) Field of Classification Search
USPC ......... 340/945, 971, 973, 974, 975; 701/3, 14
See application file for complete search history.

(56) References Cited

U.S. PATENT DOCUMENTS

| | | | |
|---|---|---|---|
| 5,940,013 A * | 8/1999 | Vladimir et al. | 340/945 |
| 7,751,947 B2 | 7/2010 | Gunn et al. | |
| 8,082,070 B2 | 12/2011 | Gunn et al. | |
| 8,570,192 B2 * | 10/2013 | McLoughlin et al. | 340/973 |
| 2006/0041340 A1 * | 2/2006 | Stefani | 701/4 |
| 2007/0236366 A1 * | 10/2007 | Gur et al. | 340/945 |
| 2010/0094595 A1 * | 4/2010 | Whittington et al. | 703/1 |
| 2011/0001796 A1 * | 1/2011 | Werjefelt et al. | 348/47 |

* cited by examiner

*Primary Examiner* — Brent Swarthout
(74) *Attorney, Agent, or Firm* — Yee & Associates, P.C.

(57) ABSTRACT

A method and apparatus for providing assistance to a flight crew during flight. An image of a group of instruments on a flight deck of an aircraft is generated with an image sensor in a data processing system. Assistance information configured to assist the flight crew from flight information displayed by the group of instruments in the image is generated. The assistance information is displayed on a display device in the data processing system.

20 Claims, 13 Drawing Sheets

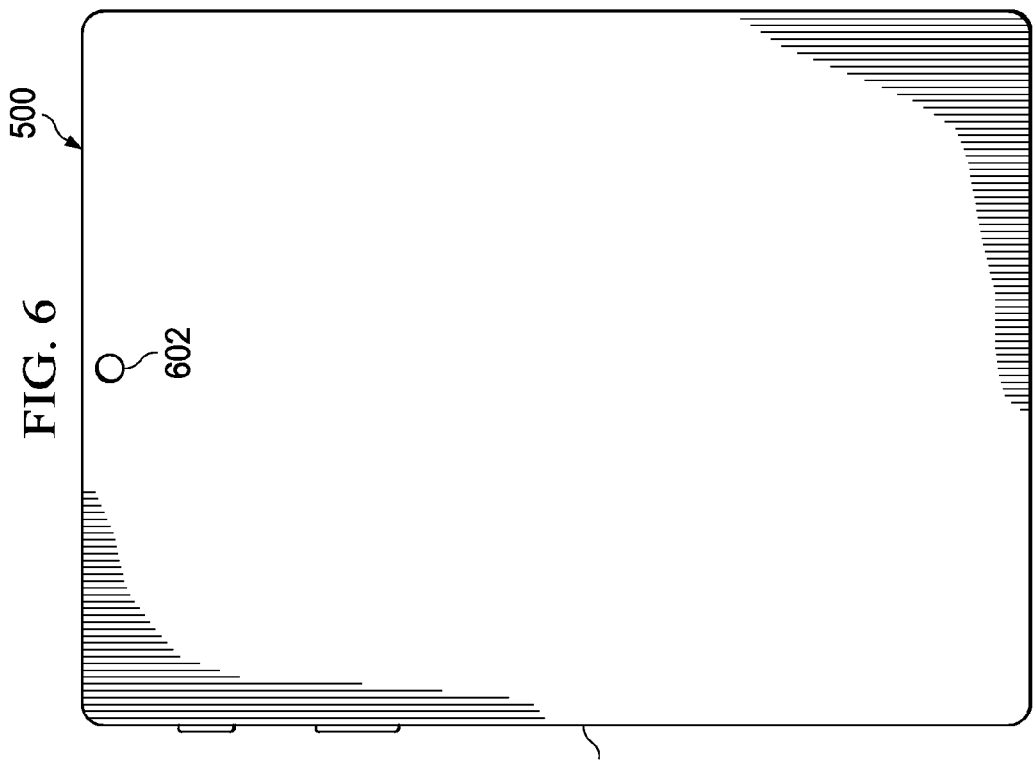
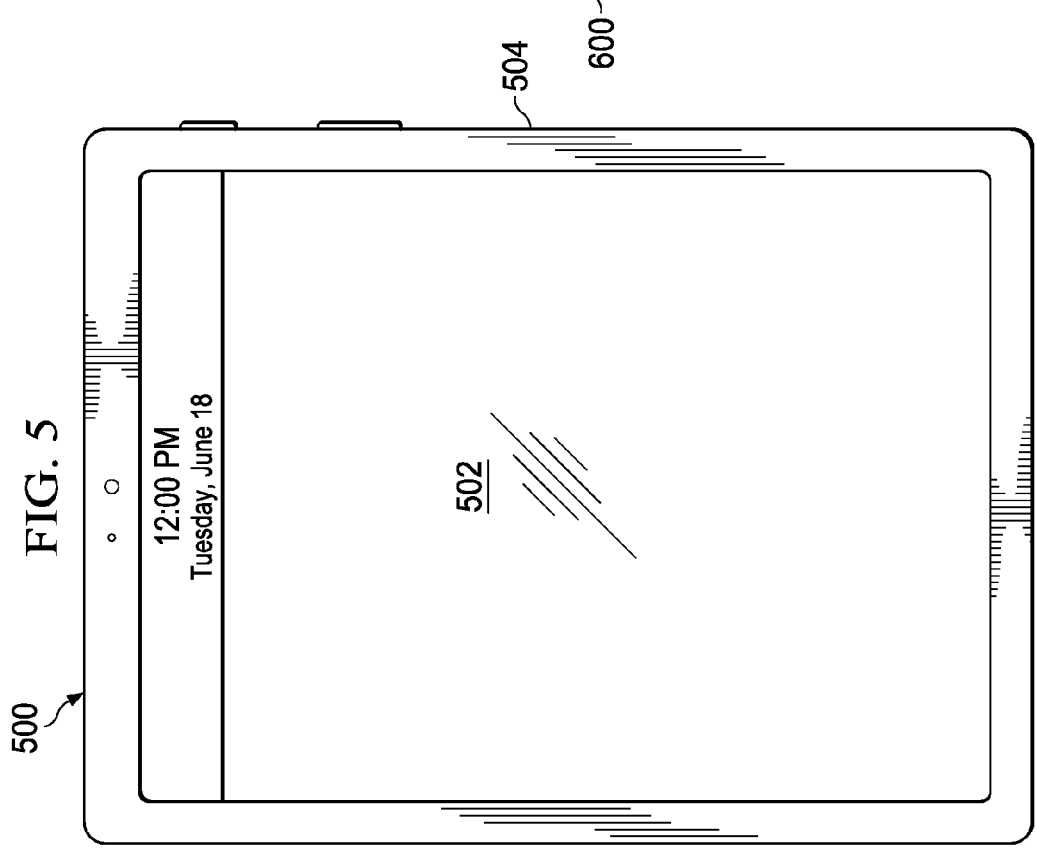

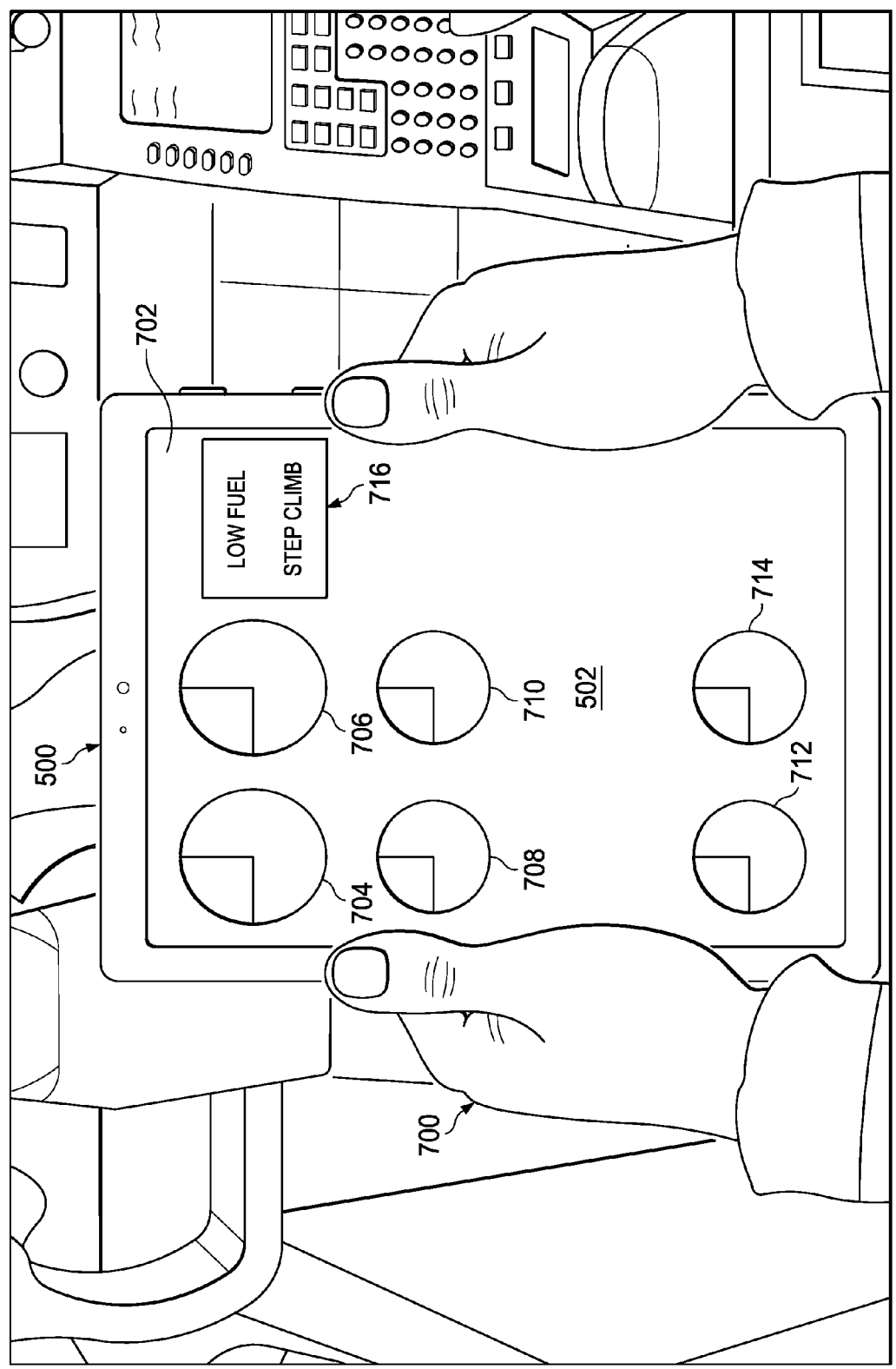

FIG. 13
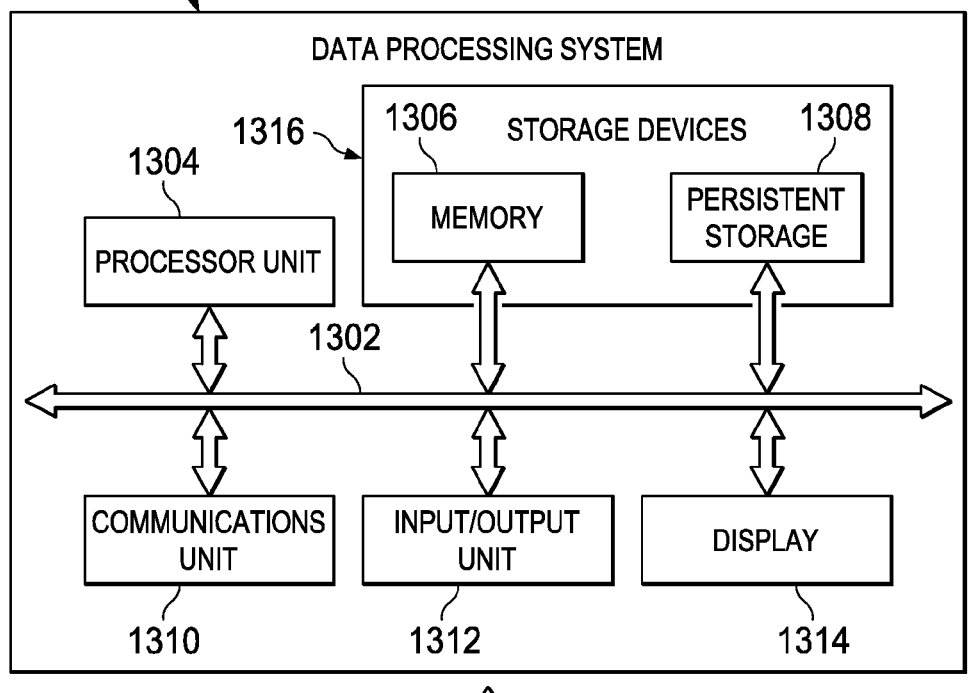
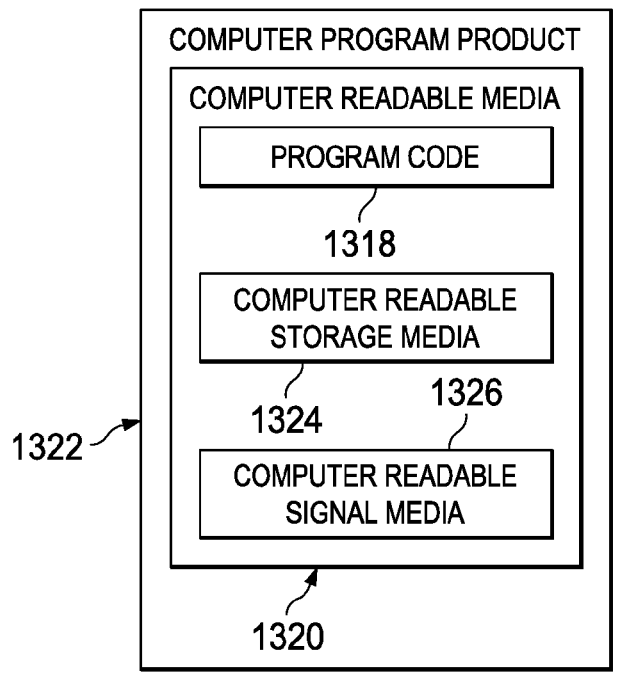

AUGMENTED REALITY AIRCRAFT MANAGEMENT SYSTEM

BACKGROUND INFORMATION

1. Field:

The present disclosure relates generally to an aircraft and, in particular, to operating an aircraft. Still more particularly, the present disclosure relates to a method and apparatus for obtaining information relating to operating the aircraft during flight of the aircraft.

2. Background:

Aircraft are becoming more and more complex. Computers and other electronics are commonly present in many aircraft. For example, the avionics in an aircraft are the electronic systems used in aircraft to manage the flight of the aircraft. For example, one system in the aircraft is a flight management system.

The cockpit or flight deck of the aircraft is a location typically near the front of aircraft from which the flight crew controls the operation of the aircraft. The flight deck includes instruments and controls. The instruments and controls enable a pilot in the flight crew to control the flight of the aircraft.

The instruments display information to the flight crew for use in operating the aircraft. These flight instruments may be complex and may vary in location and operation between different types of aircraft. As a result, a flight crew is often experienced and trained in flying a particular type of aircraft. If the flight crew is used to flying another type of aircraft, additional training and experience is often needed.

Even with experience and training, the numerous flight instruments and the information that those flight instruments display or otherwise present may make flying the aircraft more difficult than desired. This information presented through the flight instruments may be referred to as flight information. For example, a pilot may need to know more information about a message or a value of a parameter in the flight information presented to the flight instruments.

This additional information may be used to fly the aircraft more efficiently, provide for increased passengers, or other goals for the flight of the aircraft. Currently, the flight crew may refer to various flight operation manuals. This process, however, may take longer than desired.

Therefore, it would be desirable to have a method and apparatus that take into account at least some of the issues discussed above, as well as other possible issues.

SUMMARY

In one illustrative embodiment, a method for providing assistance to a flight crew during flight is provided. An image of a group of instruments on a flight deck of an aircraft is generated with an image sensor in a data processing system. Assistance information configured to assist the flight crew from flight information displayed by the group of instruments in the image is generated. The assistance information is displayed on a display device in the data processing system.

In another illustrative embodiment, an apparatus comprises an information identifier configured to generate an image of a group of instruments in a flight deck of an aircraft with an image sensor associated with a data processing system. The information identifier is further configured to generate assistance information configured to assist a flight crew from flight information displayed by the group of instruments in the image. The information identifier is still further configured to display the assistance information on a display device in the data processing system.

In yet another illustrative embodiment, a flight assistance system comprises a data processing system, a display device in the data processing system, and an information identifier. The information identifier is configured to generate an image of a group of instruments in a flight deck of an aircraft with an image sensor associated with the data processing system. The information identifier is further configured to generate assistance information configured to assist a flight crew from flight information displayed by the group of instruments in the image. The information identifier is still further configured to display the assistance information on the display device in the data processing system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a tablet computer in accordance with an illustrative embodiment;

FIG. 6 is another illustration of a tablet computer in accordance with an illustrative embodiment;

FIG. 7 is an illustration of the identification of a group of instruments in accordance with an illustrative embodiment;

FIG. 13 is an illustration of a block diagram of a data processing system in accordance with an illustrative embodiment;

DETAILED DESCRIPTION

The illustrative embodiments recognize and take into account one or more different considerations. For example, the illustrative embodiments recognize and take into account that a flight operations manual provides large amounts of information about the operation of an aircraft. The illustrative embodiments also recognize and take into account that a flight operations manual may not address a specific condition that may be indicated by the flight information presented by the instruments on the flight deck.

The illustrative embodiments also recognize and take into account that the pilot or other members of the flight crew may request additional information from the airline, aircraft manufacturer, or other source. This process may take more time than desired.

The illustrative embodiments also recognize and take into account that the request sent by the pilot may not include enough information needed to analyze the request and provide an answer. For example, although the pilot may describe the message or parameter displayed on an instrument in the request, other information may be needed from other instruments or other displays of the same instrument. When this information is unavailable, an adequate analysis of the message or parameter may not be provided to the pilot.

Thus, the illustrative embodiments provide a method and apparatus for providing assistance to a flight crew during flight of an aircraft. An image of a group of instruments in a flight deck of an aircraft is generated with an image sensor associated with a data processing system. Assistance information configured to assist the flight crew is generated from flight information displayed by the group of instruments in the image. The assistance information is displayed on a display device in the data processing system.

As used herein, a "group of," when used with reference to items, means one or more items. For example, a group of instruments is one or more instruments.

Figure 1:
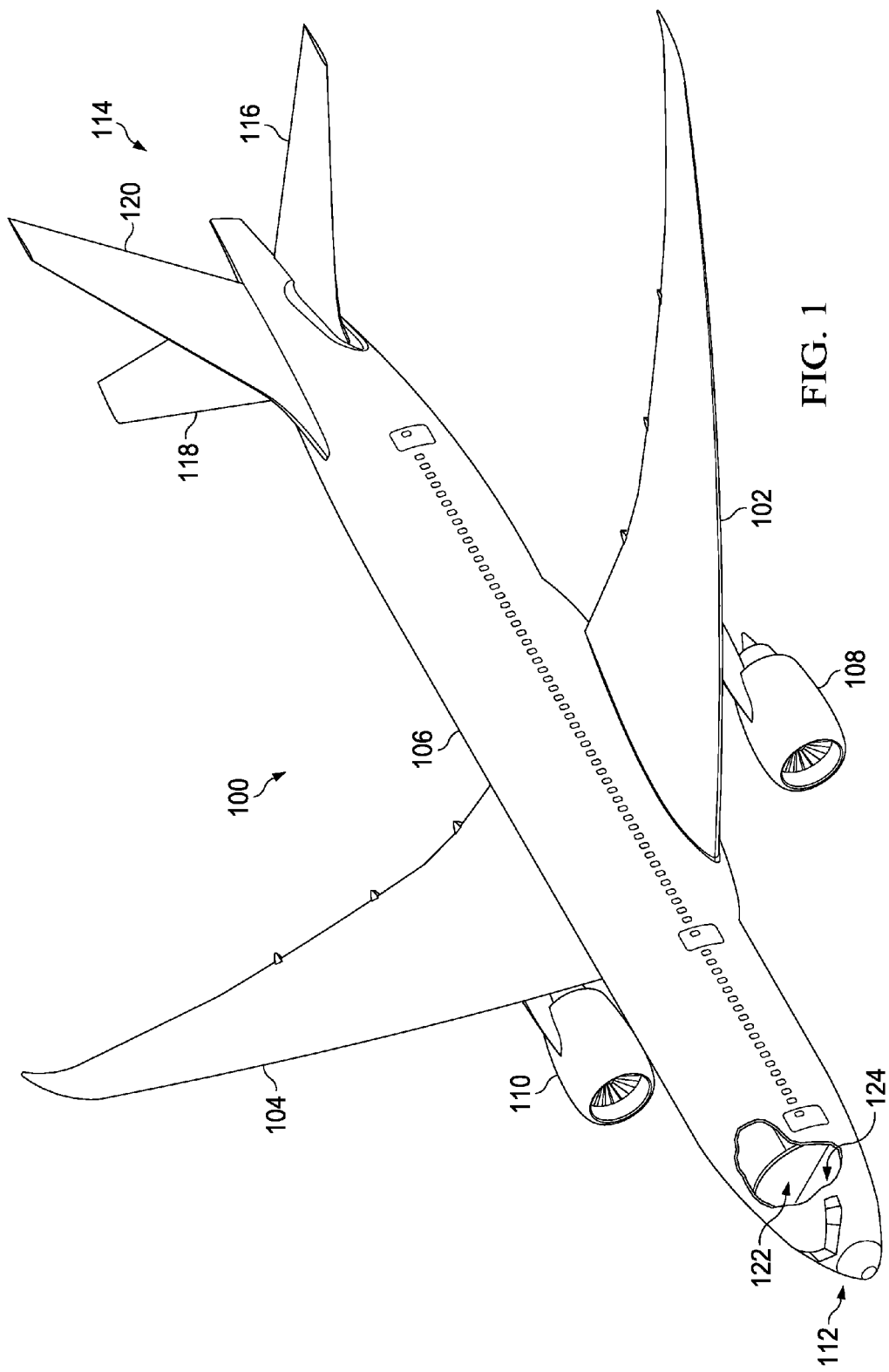
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

In this illustrative example, flight deck 122 is located in nose section 112 of body 106 of aircraft 100. Instruments 124 in flight deck 122 may display flight information. The flight crew may have questions about the flight information displayed by instruments 124 in flight deck 122. An augmented reality aircraft management system may be used within flight deck 122 to provide additional information that may be desired by the flight crew to operate aircraft 100.

Figure 2:
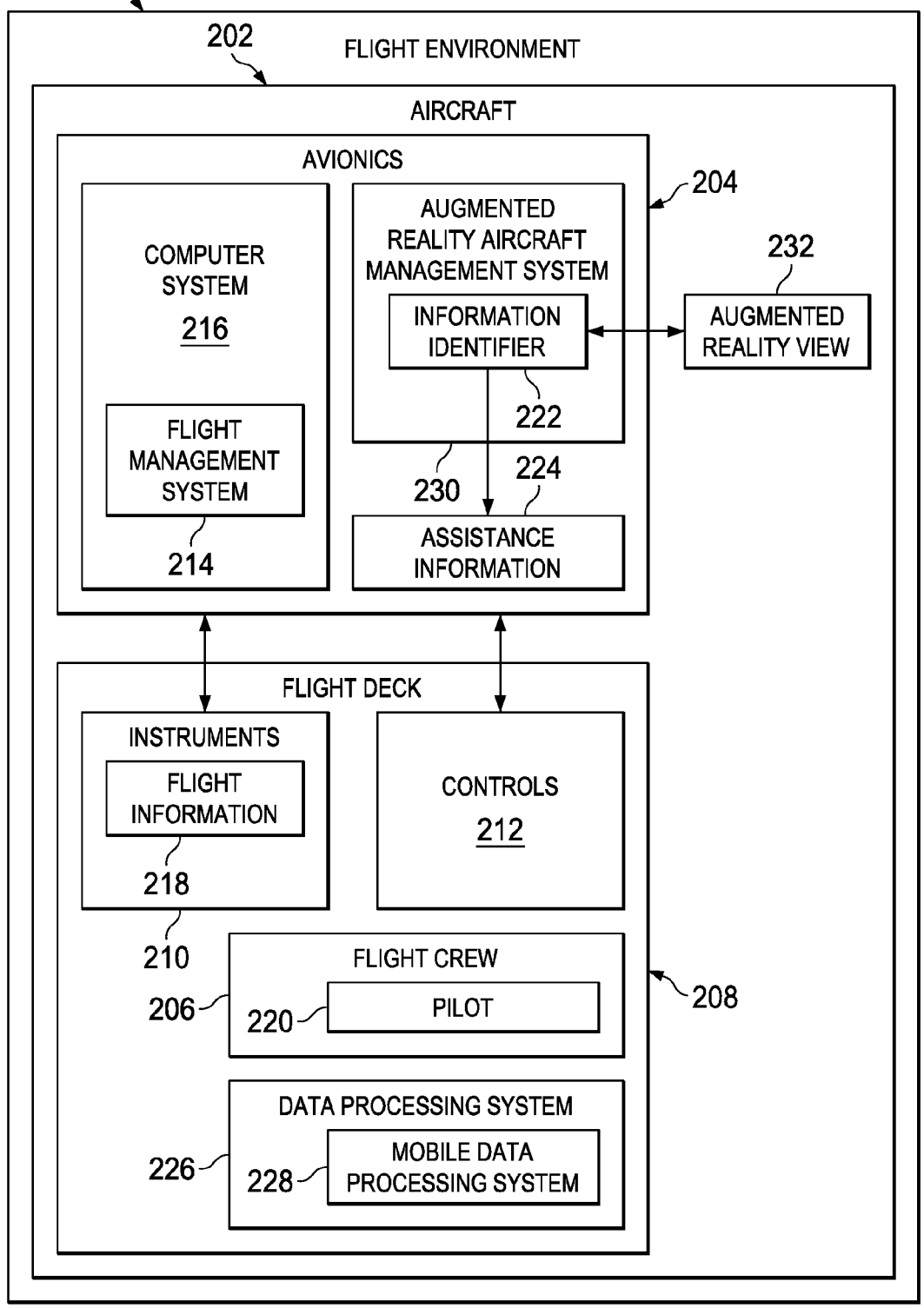
FIG. 2 is an illustration of a block diagram of a flight environment in accordance with an illustrative embodiment.

With reference now to FIG. 2, an illustration of a block diagram of a flight environment is depicted in accordance with an illustrative embodiment. In this illustrative example, flight environment 200 is an example of an environment in which aircraft 202 may operate. Aircraft 100 in FIG. 1 is an example of one implementation for aircraft 202.

Aircraft 202 includes avionics 204. Flight crew 206 in flight deck 208 of aircraft 202 may interact with avionics 204. This interaction may occur through instruments 210 and controls 212 on flight deck 208.

For example, flight crew 206 may manage the operation of aircraft 202 using flight management system 214 in avionics 204. In this illustrative example, flight management system 214 may be implemented in computer system 216 in avionics 204. Flight management system 214 is configured to perform in-flight tasks to reduce the workload of flight crew 206. For example, flight management system 214 may include in-flight management of a flight plan, perform position identification of aircraft 202, provide course guidance, vertical navigation, and other functions.

As depicted, instruments 210 displays flight information 218 on instruments 210. Based on flight information 218, flight crew 206 may manipulate controls 212 to manage the operation of aircraft 202. In these illustrative examples, flight information 218 may take various forms. For example, flight information 218 may be at least one of a parameter for the flight of an aircraft, a message, or some other suitable information that may be displayed by instruments 210.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In the illustrative examples, one or more of flight crew 206 may desire more information about flight information 218. For example, pilot 220 in flight crew 206 may not understand the message in flight information 218 displayed by instruments 210.

In these illustrative examples, assistance may be provided to pilot 220 and others in flight crew 206 during flight of aircraft 202 in obtaining assistance about flight information 218. In particular, information identifier 222 is configured to generate assistance information 224 to flight crew 206 from flight information 218 displayed by instruments 210 in flight deck 208.

As depicted, assistance information 224 may take various forms. For example, assistance information 224 may be at least one of a description, an analysis, a possible solution, company specific information, or other suitable types of information that may assist flight crew 206 in the operation of aircraft 202. In the illustrative example, the analysis may be or may include a possible solution to the issue that may be present in flight information 218. The possible solution may be a workaround or procedure that may be performed.

In these illustrative examples, information identifier 222 may be implemented in software, hardware, firmware or a combination thereof. When software is used, the operations performed by information identifier 222 may be implemented in program code configured to run on a processor unit. When firmware is used, the operations performed by information identifier 222 may be implemented in program code and data and stored in persistent memory to run on a processor unit. When hardware is employed, the hardware may include circuits that operate to perform the operations in information identifier 222.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In the illustrative example, information identifier 222 may be located in avionics 204. In particular, information identifier 222 may be implemented in computer system 216 and may be located in flight management system 214.

In yet other illustrative examples, information identifier 222 may be implemented in hardware such as data processing system 226. As depicted, data processing system 226 may be mobile data processing system 228 used by flight crew 206. For example, data processing system 226 may be an electronic flight bag, a tablet computer, a laptop computer, a mobile phone, augmented reality glasses, or some other suitable type of computing device.

In particular, information identifier 222 may be part of augmented reality aircraft management system 230. In this type of implementation, assistance information 224 may be displayed in augmented reality view 232 to one or more of flight crew 206.

Figure 3:
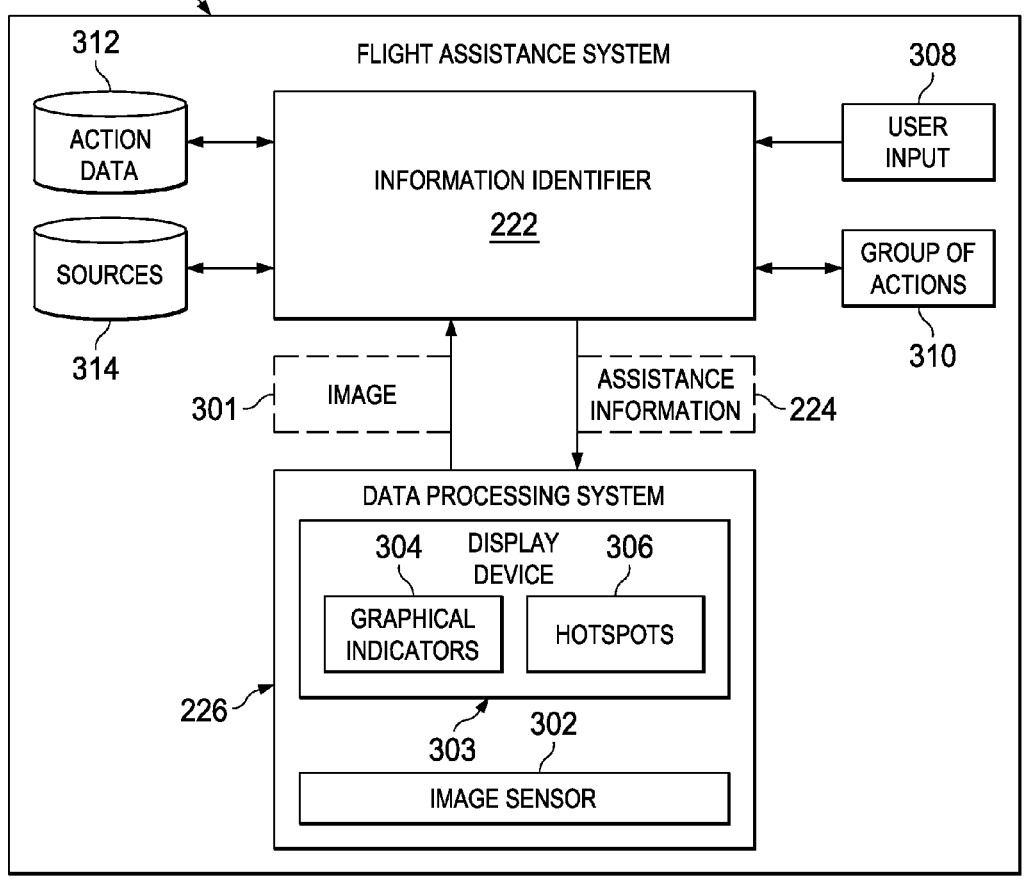
FIG. 3 is an illustration of a block diagram for providing assistance information in accordance with an illustrative embodiment.

With reference next to FIG. 3, an illustration of a block diagram for providing assistance information is depicted in accordance with an illustrative embodiment. In this illustrative example, information identifier 222 is configured to provide assistance to flight crew 206 in FIG. 2. In particular, information identifier 222 is configured to generate assistance information 224.

This assistance may be performed in conjunction with data processing system 226. As depicted, information identifier 222 and data processing system 226 form flight assistance system 300.

In this illustrative example, assistance information 224 is generated from input from data processing system 226. In particular, data processing system 226 generates image 301 of a group of instruments 210 on flight deck 208 from FIG. 2 with image sensor 302 in data processing system 226.

In this illustrative example, image sensor 302 may be, for example, a camera. The camera may generate still images, video images, or other types of images depending on the particular implementation.

Assistance information 224 is displayed on display device 303 in data processing system 226. Display device 303 is also considered part of flight assistance system 300.

Display device 303 may take various forms. For example, display device 303 may be a liquid crystal display, a light emitting diode display, a touch screen, or some other suitable type of display device.

As depicted, information identifier 222 may identify a group of instruments 210 from FIG. 2 in image 301. Based on this identification, a group of graphical indicators 304 is displayed in association with the group of instruments 210 in image 301 on display device 303. The group of graphical indicators 304 is considered to be displayed in association with the group of instruments 210 when the group of graphical indicators 304 draws attention to the group of instruments 210.

Additionally, the group of graphical indicators 304 in image 301 may be a group of hotspots 306. In other words, the group of hotspots 306 may be selectable by user input 308 from flight crew 206. The selection of a hotspot in the group of hotspots 306 may be used to identify which parts of flight information 218 in FIG. 2 needs assistance information 224.

For example, if a hotspot in the group of hotspots 306 for a message displayed on an instrument in the group of instruments 210 is selected, the message may be used to identify assistance information 224 for that particular instrument and, in particular, for that particular message. In some cases, user input 308 may be needed to identify assistance information 224. In other words, user input 308 may identify additional flight information that may not be displayed in the group of instruments 210 in the current view of the group of instruments 210.

In this case, group of actions 310 may be displayed on display device 303. Group of actions 310 is configured to generate additional information needed for an analysis to generate assistance information 224 for the instrument selected from the group of instruments 210.

Group of actions 310 may take various forms. For example, group of actions 310 may include at least one of generating an image of a group of parameters displayed on another group of instruments 210, changing a display on the group of instruments 210, or entering user input. In these illustrative examples, group of actions 310 may be identified from action database 312. Action database 312 may include an identification of flight information 218 that may be displayed on instruments 210. Flight information 218 identified in action database 312 may be associated with an indication of whether assistance information 224 is needed for flight information 218. Additionally, action database 312 also may indicate whether actions in group of actions 310 may be needed, identify actions in group of actions 310 when actions are needed to obtain additional information for use in generating assistance information 224, or both.

In identifying assistance information 224, information identifier 222 may access a group of sources 314. The group of sources 314 may be located on aircraft 202, in a location remote to aircraft 202, or some combination thereof.

As depicted, the group of sources 314 may be selected from at least one of a local database on the aircraft, a remote database located off the aircraft, a web service, a cloud computing system, or some other suitable source of information. For example, a source in the group of sources 314 may be an artificial intelligence program, a human expert located at the airline or manufactured depending on implementation, or some other suitable type of source.

Once assistance information 224 is identified, assistance information 224 may be displayed in association with image 301 on display device 303. In this illustrative example, image 301 may be updated constantly by image sensor 302 in this illustrative example.

In particular, this display may be augmented reality view 232 of the group of instruments 210. In other words, a live, real-time view of the group of instruments 210 is displayed on display device 303 with assistance information 224 displayed with this view. In this manner, real-time assistance may be provided to flight crew 206 when questions arise about flight information 218 displayed on instruments 210 on flight deck 208 in aircraft 202.

The illustration of flight environment 200 and the different components in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information identifier 222 may be located in a location other than aircraft 202. For example, information identifier 222 may be located at an airport, an aircraft manufacturer, an airline, or some other suitable location.

With reference now to FIGS. 4-11, illustrations of the generation of assistance information are depicted in accordance with an illustrative embodiment. These figures illustrate one manner in which assistance information may be generated for use in operating an aircraft.

Figure 4:
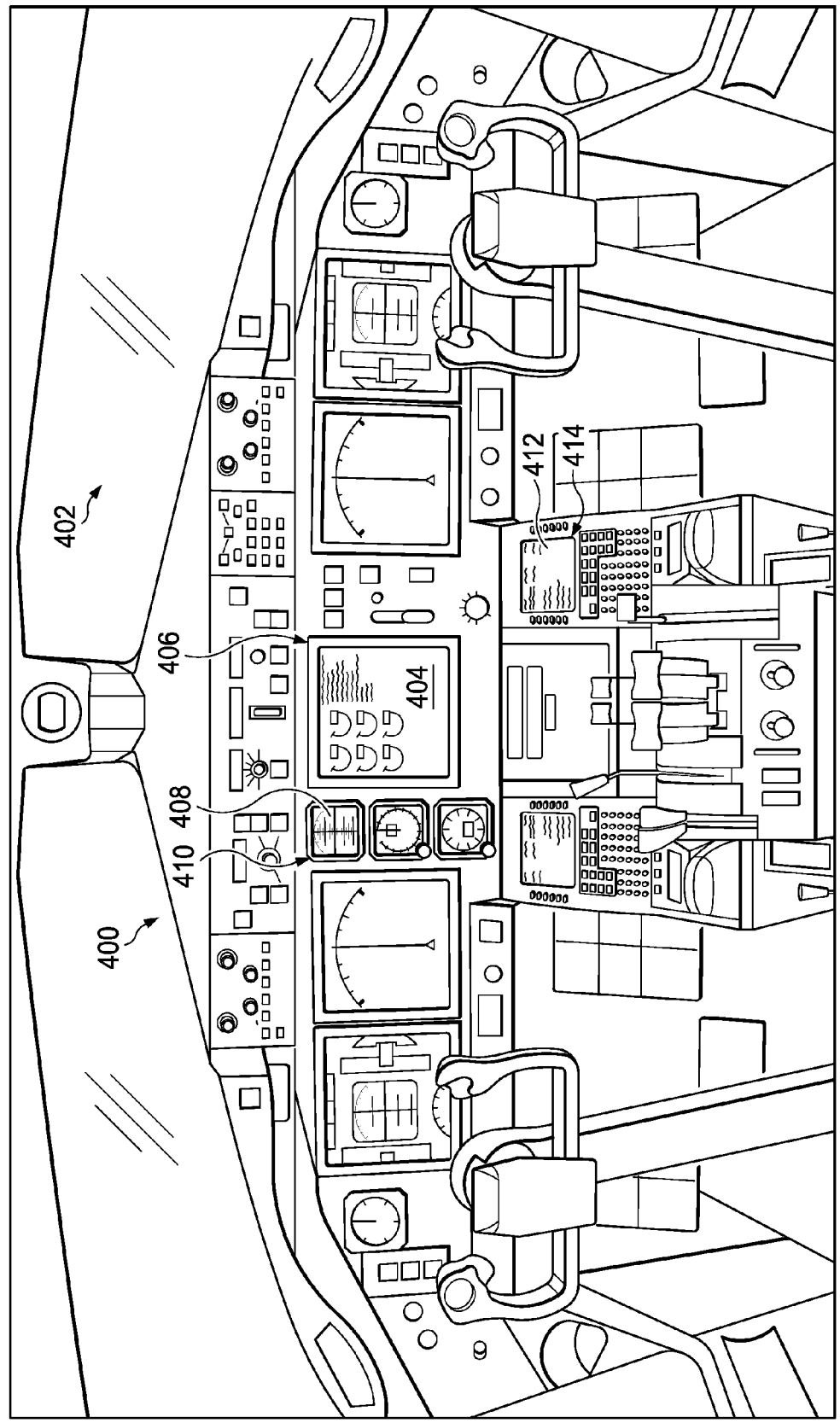
FIG. 4 is an illustration of instruments on a flight deck in an aircraft in accordance with an illustrative embodiment.

With reference first to FIG. 4, an illustration of instruments on a flight deck in an aircraft is depicted in accordance with an illustrative embodiment. In this illustrative example, instruments 400 on flight deck 402 are examples of instruments 210 on flight deck 208 shown in block form in FIG. 2.

A group of instruments may be displayed on a single display device or multiple display devices. For example, display device 404 displays a group of instruments 406 in instruments 400 in flight deck 402. In another illustrative example, display device 408 displays instrument 410 in instruments 406. As another example, display device 412 displays instrument 414 in instruments 406.

In FIG. 5, an illustration of a tablet computer is depicted in accordance with an illustrative embodiment. In this illustrative example, tablet computer 500 is an example of one implementation for data processing system 226 in FIG. 2 and FIG. 3. As depicted, tablet computer 500 has a display device in the form of touch screen 502 on side 504 of tablet computer 500. Touch screen 502 is an example of an implementation for display device 303 in FIG. 3. Touch screen 502 also may be used to receive user input.

Turning next to FIG. 6, another illustration of a tablet computer is depicted in accordance with an illustrative embodiment. In this view, side 600 of tablet computer 500 is shown. In this view, camera 602 is an example of an implementation for image sensor 302 shown in block form in FIG. 3.

With reference to FIG. 7, an illustration of the identification of a group of instruments is depicted in accordance with an illustrative embodiment. In this depicted example, pilot 700 has positioned tablet computer 500 to generate image 702 of a group of instruments 406 from FIG. 4 on touch screen 502. In this illustrative example, the group of instruments 406 is displayed on display device 404 on flight deck 402 from FIG. 4.

Seen in this view, the group of instruments 406 includes gauge 704, gauge 706, gauge 708, gauge 710, gauge 712, gauge 714, and message field 716. In this illustrative example, image 702 may be processed to provide assistance information to pilot 700.

Figure 8:
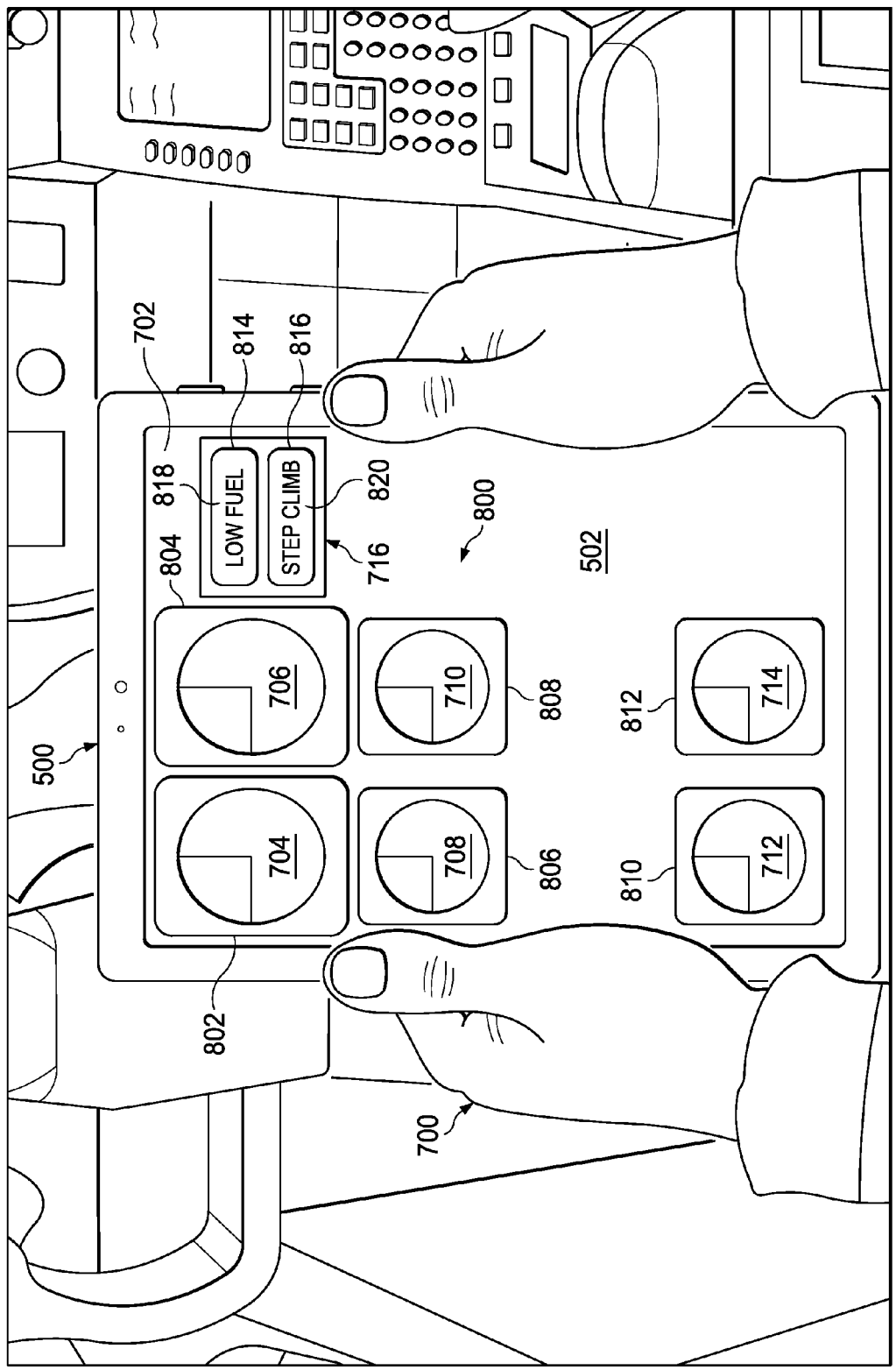
FIG. 8 is an illustration of a group of instruments displayed on a tablet computer in accordance with an illustrative embodiment.

In FIG. 8, an illustration of a group of instruments displayed on a tablet computer is depicted in accordance with an illustrative embodiment. In this illustrative example, image 702 is processed to identify instruments for which assistance information may be identified.

As depicted, graphical indicators 800 are displayed in association with the group of instruments 406 shown in image 702. In particular, graphical indicators 800 includes graphical indicator 802, graphical indicator 804, graphical indicator 806, graphical indicator 808, graphical indicator 810, graphical indicator 812, graphical indicator 814, and graphical indicator 816.

As seen, a graphical indicator may be associated with the particular instrument or portion of an instrument. For example, graphical indicator 802, graphical indicator 804, graphical indicator 806 graphical indicator 808, graphical indicator 810, and graphical indicator 812 are displayed in association with gauge 704, gauge 706, gauge 708, gauge 710, gauge 712, and gauge 714, respectively. In contrast, graphical indicator 814 and graphical indicator 816 are displayed in association with message 818 and message 820, respectively, in message field 716.

In these illustrative examples, graphical indicators 800 take the form of lines displayed around the instruments that may be selected. Of course, graphical indicators 800 may also take other forms. For example, graphical indicators 800 may form at least one of text, icons, animation, color, shading, cross hatching, or other suitable types of graphics that may draw attention to a particular instrument or portion of an instrument. Further, in the illustrative examples, graphical indicators 800 include hotspots that may be selectable.

Figure 9:
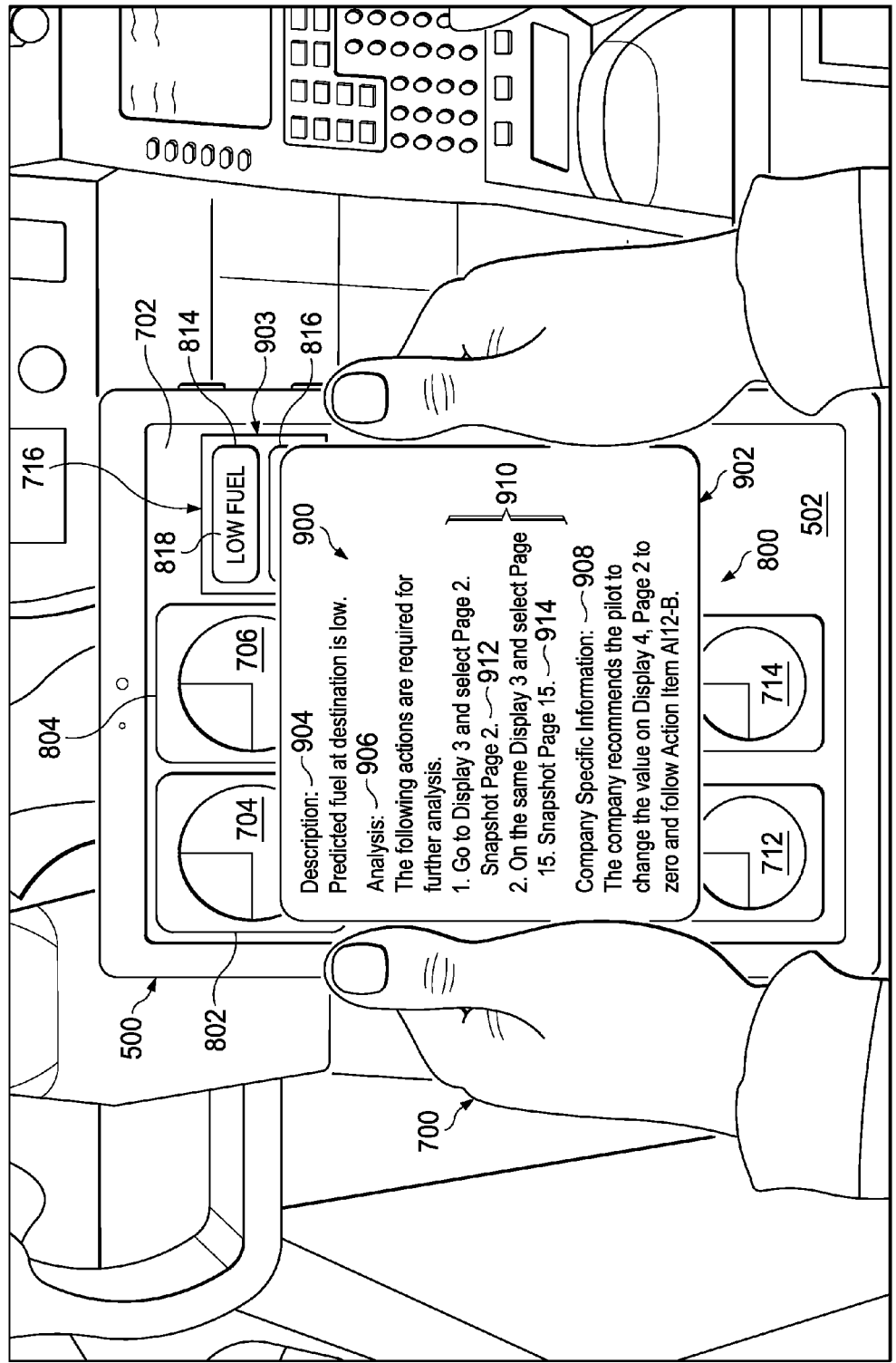
FIG. 9 is an illustration of assistance information in accordance with an illustrative embodiment.

Turning next to FIG. 9, an illustration of assistance information is depicted in accordance with an illustrative embodiment. In this depicted example, assistance information 900 is displayed within window 902. Window 902 is displayed on image 702 of the group of instruments 406.

As depicted, assistance information 900 displayed in window 902 is for message 903 in message field 716. Message 903 is selected by the selection of graphical indicator 814 in FIG. 8. The selection may be by pilot 700 collecting graphical indicator 814 through touch screen 502.

In this illustrative example, image 702 displayed on touch screen 502 may be updated constantly to form a live view of the group of instruments 406. As depicted, image 702 within window 902 forms an augmented reality of the group of instruments 406.

In other illustrative examples, image 702 may be static. In other words, image 702 may be the image initially generated by tablet computer 500.

In this illustrative example, assistance information 900 in this illustrative example may include a number of different types of information. As depicted, assistance information 900 includes description 904, analysis 906, and company specific information 908.

Description 904 states that the predicted fuel at the destination is low. Company specific information 908 indicates that the change in a value followed by an action is recommended.

In this particular example, analysis 906 is incomplete. Analysis 906 identifies actions 910 that are needed to complete the identification of assistance information 900. As depicted, action 912 requests generating an image on another display device. Action 914 requests generating an image of another page on the same display device, display device 404.

Figure 10:
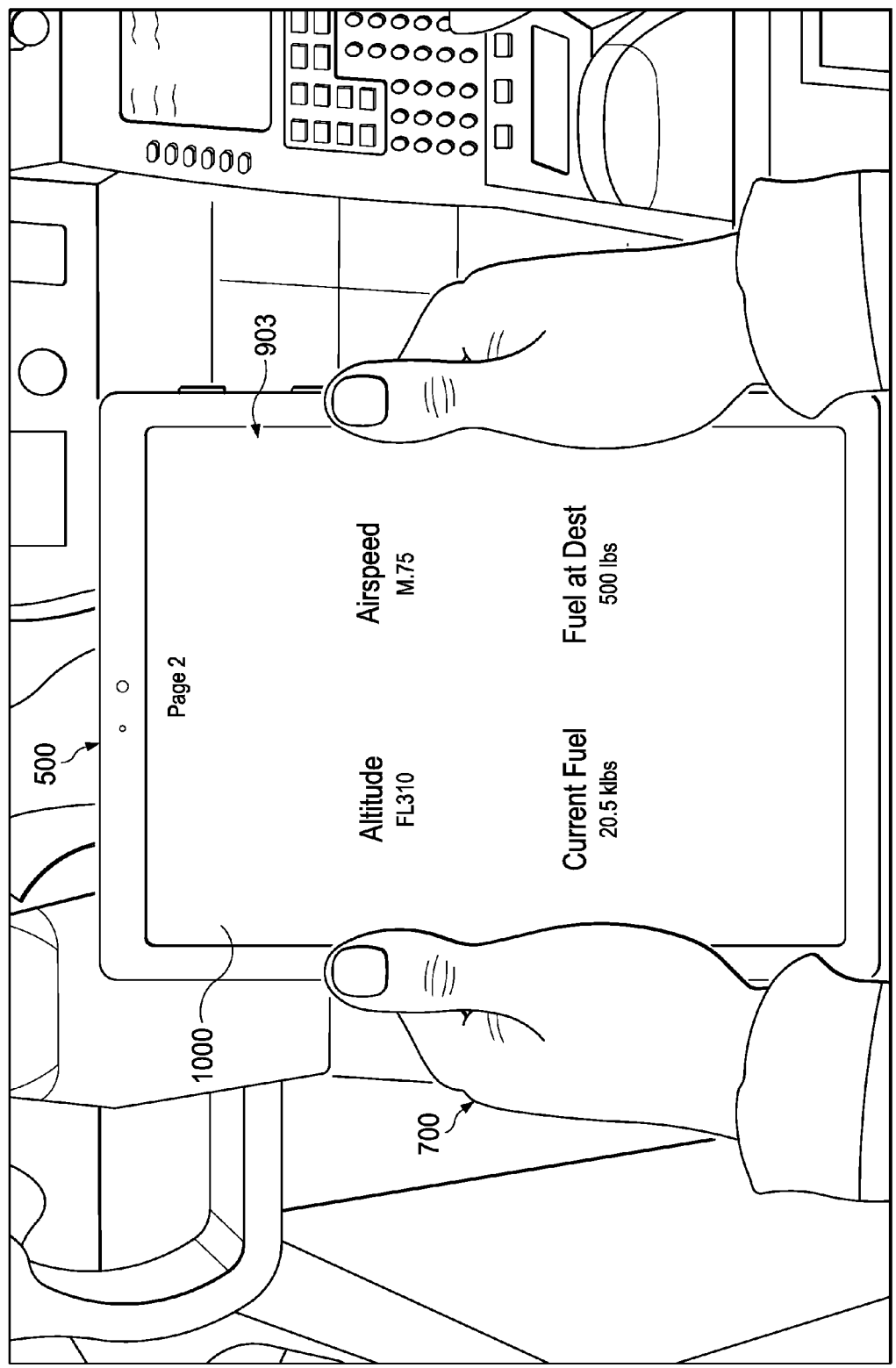
FIG. 10 is an illustration of an identification of flight information in accordance with an illustrative embodiment.

Turning next to FIG. 10, an illustration of an identification of flight information is depicted in accordance with an illustrative embodiment. In this illustrative example, tablet computer 500 has been moved to generate image 1000 on touch screen 502. Image 1000 is an image of instrument 414 in FIG. 4. Instrument 414 is selected by following action 912 in actions 910 as displayed in window 902 in FIG. 9. In a similar fashion, action 914 from FIG. 9 may be performed by changing the page displayed for instrument 414 and generating an image of the page.

Figure 11:
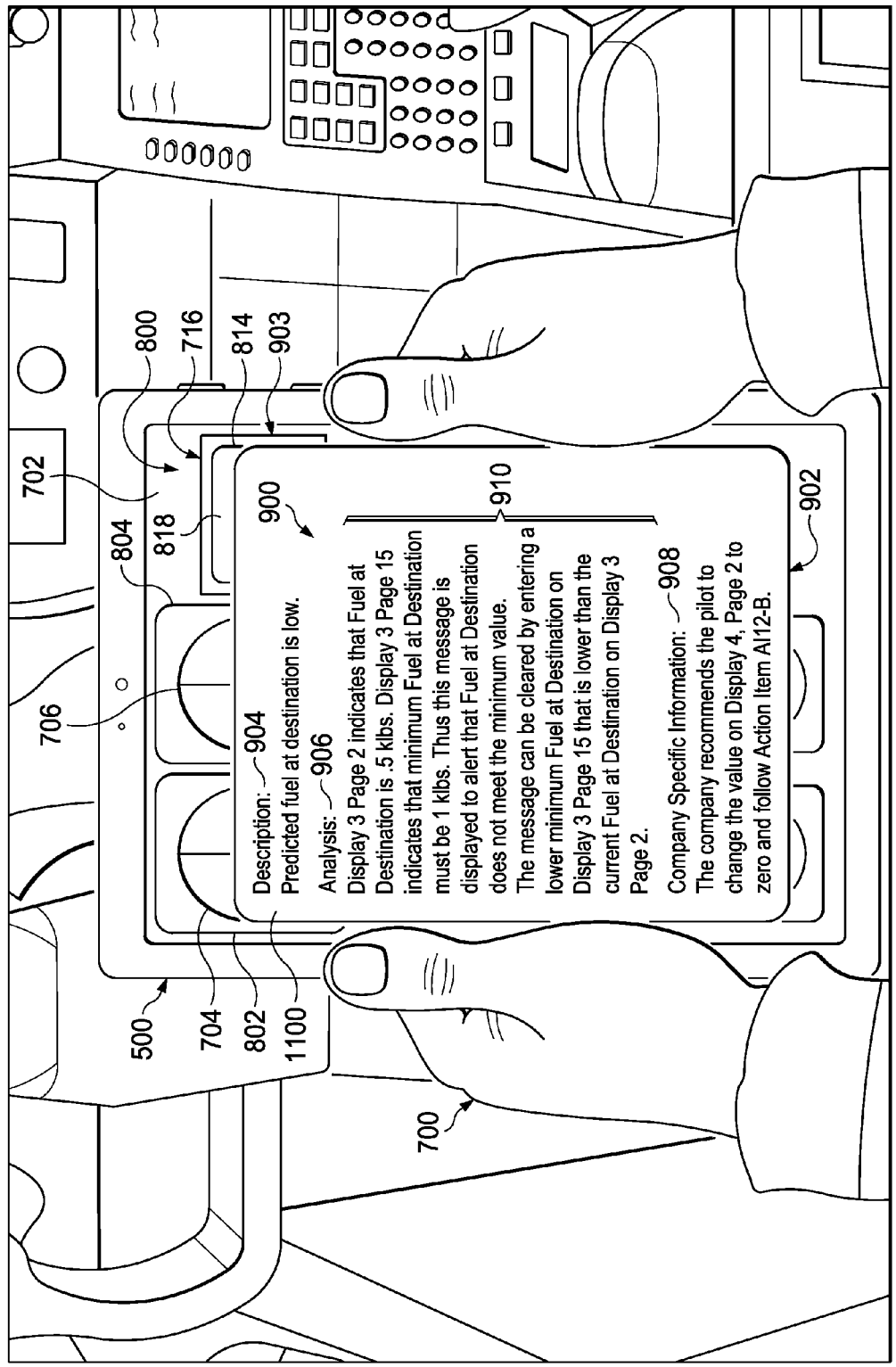
FIG. 11 is an illustration of the display of assistance information in accordance with an illustrative embodiment.

With reference now to FIG. 11, an illustration of the display of assistance information is depicted in accordance with an illustrative embodiment. In response to performing actions 910 as displayed in window 902 in FIG. 9, the analysis of message 903 may be completed. As can be seen in this figure, analysis 906 now displays information 1100 in assistance information 900 rather than an action that is requested.

In the illustrative example, analysis 906 also may recommend possible solutions to resolve an issue that may be present. For example, analysis 906 also states, "The message can be cleared by entering a lower minimum Fuel at Destination on Display 3 Page 15 that is lower than the current Fuel at Destination on Display 3 Page 2."

The illustrations of the generation of assistance information in FIGS. 4-11 are not meant to limit the manner in which different illustrative embodiments may be performed. For example, actions 910 may be unnecessary in some illustrative examples. As a result, window 902 in FIG. 9 displays information in assistance information 900 instead of actions 910, actions 910 are unnecessary.

In another illustrative example, graphical indicators 800 may be changing the color of the group of instruments 406 rather than displaying lines encompassing the group of instruments 406. In addition, although the images have been described with respect to updating image 702 and displaying window 902 to display an augmented reality view, in some illustrative examples, image 702 may not be updated to provide a live view. Instead, window 902 may be displayed with image 702 being an image generated at a prior time.

The different components shown in FIG. 1 and FIGS. 4-11 may be combined with components in FIG. 2 and FIG. 3, used with components in FIG. 2 and FIG. 3, or a combination of the two. Additionally, some of the components in FIG. 1 and FIGS. 4-11 may be illustrative examples of how components shown in block form in FIG. 2 and FIG. 3 can be implemented as physical structures.

Figure 12:
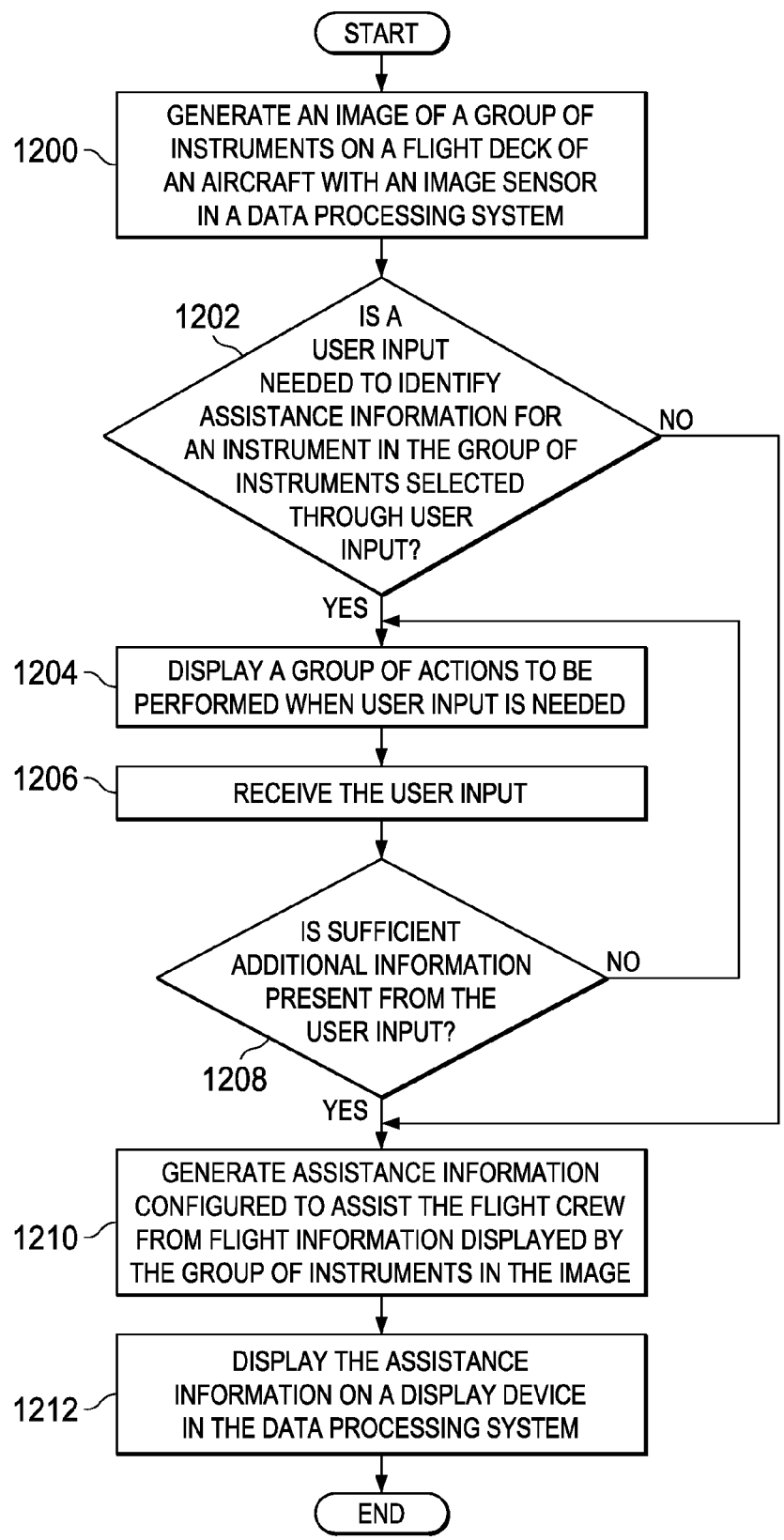
FIG. 12 is an illustration of a flowchart of a process for providing assistance to a flight crew during flight in accordance with an illustrative embodiment.

Turning now to FIG. 12, an illustration of a flowchart of a process for providing assistance to a flight crew during flight is depicted in accordance with an illustrative embodiment. The process illustrated in FIG. 12 may be implemented in flight environment 200 and the different components illustrated for flight environment 200 in FIG. 2 and FIG. 3. In this illustrative example, the process illustrated in FIG. 12 may be implemented in information identifier 222 as depicted in FIG. 2 and FIG. 3.

The process begins by generating an image of a group of instruments on a flight deck of an aircraft with an image sensor in a data processing system (operation 1200). As described above, this process may be implemented in the data processing system or in another location. In the illustrative examples, the data processing system may be a tablet computer or some other portable data processing system.

Next, the process determines whether a user input is needed to identify assistance information for an instrument in the group of instruments selected through user input (operation 1202). If additional information is needed, the process displays a group of actions to be performed when user input is needed (operation 1204). The process then receives the user input (operation 1206).

A determination is made as to whether sufficient additional information is present from the user input (operation 1208). If additional information is insufficient, the process returns to operation 1204.

Otherwise, the process generates assistance information configured to assist the flight crew from flight information displayed by the group of instruments in the image (operation 1210). The process also proceeds to operation 1210 from operation 1202 if a user input is unnecessary to identify the assistance information.

The process then displays the assistance information on a display device in the data processing system (operation 1212), with the process terminating thereafter. This display in operation 1212 may be a live view such as that for an augmented reality view. In other illustrative examples, the display may be a static display in which the assistance information is displayed on an image generated at a prior time. In still other illustrative examples, the assistance information may be displayed without images of the group of instruments.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

For example, the different operations in FIG. 12 may be repeated continuously. If the flight information for an instrument changes, then the assistance information may also change. In other words, a pilot may hold a tablet computer to generate an image and select an instrument from the image. The process analyzes the flight information displayed by the instrument to generate assistance information. If the flight information changes, the process may also change the assistance information to reflect the most up-to-date information for the pilot.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 13, an illustration of a block diagram of a data processing system is depicted in accordance with an illustrative embodiment. Data processing system 1300 may be used to implement computer system 216 in FIG. 2. Data processing system 1300 also may be used to implement data processing system 226 and mobile data processing system 228 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communication framework may take the form of a bus system or Ethernet cable.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code 1318.

Figure 14:
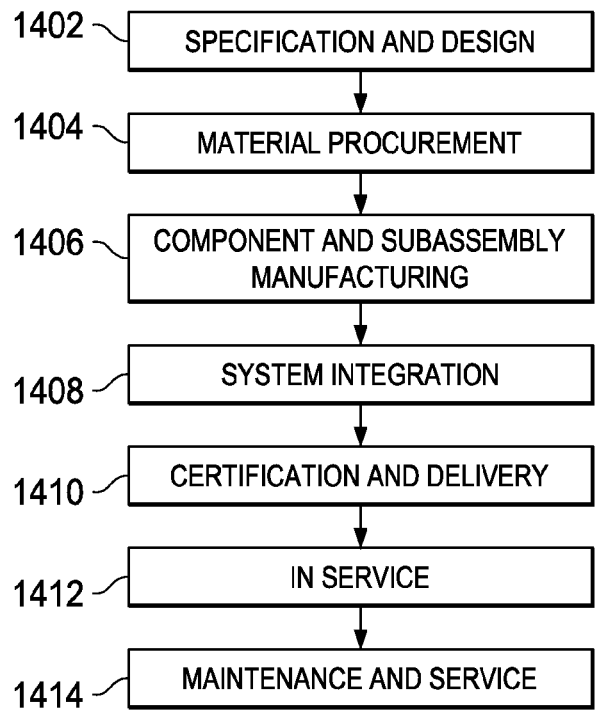
FIG. 14 is an illustration of a block diagram of an aircraft manufacturing and service method in accordance with an illustrative embodiment.
Figure 15:
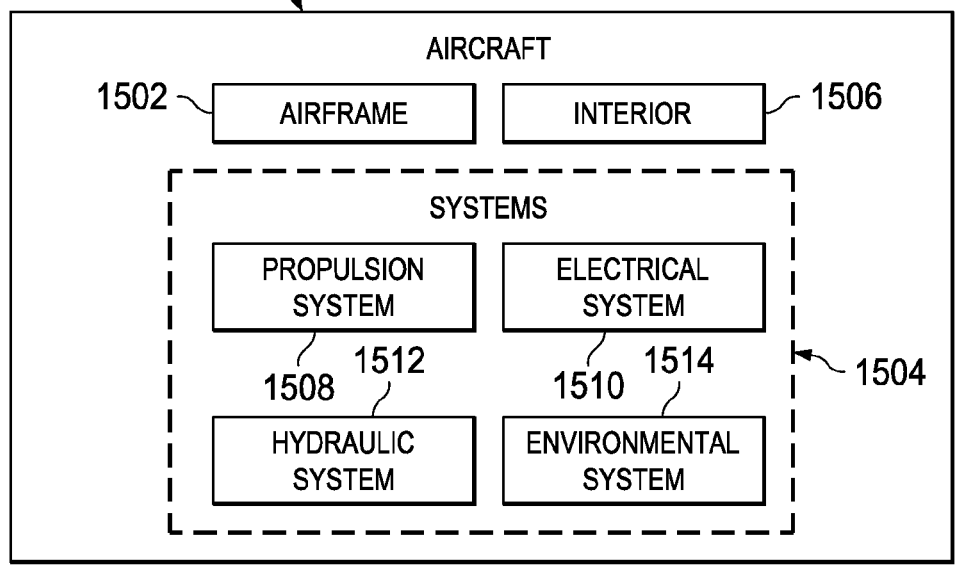
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, an illustrative embodiment may be implemented in aircraft 1500 during components and subassembly manufacturing 1406 or system integration 1408. Further, an illustrative embodiment may be used during in service 1412 to provide assistance information to a flight crew of an aircraft. As another example, an illustrative embodiment may be implemented in aircraft 1500 during maintenance and service 1414. For example, an illustrative embodiment may be added to aircraft 1500 during routine maintenance, upgrades, refurbishment, or other operations. The use of a number of the different illustrative embodiments may substantially reduce the time needed by a flight crew to obtain assistance information for use in operating aircraft 1500 during in service 1412 of aircraft 1500.

Thus, the illustrative embodiments provide a method and apparatus for providing assistance to the flight crew of an aircraft. As described above, the illustrative embodiments may identify a request for assistance information based on an image of a group of instruments. The selection of an instrument from the group of instruments may be used identify assistance information for flight information that may be displayed on an instrument.

Further, the illustrative embodiments also provide an ability to identify when additional information is needed to generate the assistance information. When additional information is needed, the process requests user input to obtain that information. As described above, the flight crew may be prompted to different instruments or different pages or displays on an instrument.

The description of the different illustrative embodiments has been presented for purposes of illustration and description, and is not intended to be exhaustive or limited to the embodiments in the form disclosed. Many modifications and variations will be apparent to those of ordinary skill in the art. For example, although the illustrative examples are directed towards generating assistance information about the display of flight information, the illustrative embodiments may be applied to other devices in aircraft. For example, assistance information may be generated from images of controls in the aircraft. For example, the positions of switches on the flight deck of an aircraft may be used to generate assistance information about the switches and their positions.

These different operations may be formed through a data processing system such as a tablet computer. The assistance information may be displayed using an augmented reality view to provide context of the assistance information relative to the particular flight information displayed on an instrument.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing assistance to a flight crew during flight, the method comprising:
   receiving, in an information identifier component of a computer system, an image of flight information from an image sensor;
   processing, in the information identifier, the image and generating graphical indicators, for a group of instruments on a flight deck of an aircraft, on a display device;
   determining, using a data processor in a flight assistance system, whether the information identifier requires a user input to identify assistance information for an instrument in the group of instruments, and, when the information identifier requires the user input, displaying, on the display device, a group of actions to be performed;
   generating, in the information identifier, using the flight information displayed by the group of instruments in the image, assistance information that assists the flight crew; and
   displaying the assistance information on the display device.

2. The method of claim 1, wherein displaying the assistance information on the display device in the data processing system comprises:
   displaying a live view of the group of instruments on the display device; and
   displaying the assistance information on the live view of the group of instruments.

3. The method of claim 2, wherein the live view and the assistance information are for an augmented reality view displayed on the display device.

4. The method of claim 1, wherein the group of actions generate additional information needed for an analysis to generate the assistance information for the instrument selected from the group of instruments.

5. The method of claim 1, wherein the group of actions is selected from at least one of: generating an image of a group of parameters displayed on another group of instruments, and changing a display in the group of instruments.

6. The method of claim 1, wherein generating the assistance information comprises:
   searching a group of sources for the assistance information.

7. The method of claim 6, wherein the group of sources is selected from at least one of a local database on the aircraft, a remote database located off the aircraft, a web service, and a cloud computing system.

8. The method of claim 1, wherein generating the assistance information comprises:
   displaying a group of graphical indicators in association with the group of instruments in the image, wherein the group of graphical indicators indicates that the group of instruments is selectable; and
   identifying the assistance information from the flight information for the instrument in the group of instruments.

9. The method of claim 8, wherein the flight information is at least one of a parameter for the flight of the aircraft or a message.

10. The method of claim 1, wherein the assistance information comprises at least one of a description, an analysis, a possible solution, or company specific information.

11. An apparatus, comprising a computer system comprising an information identifier configured to:
   receive from an image sensor, an image of a group of instruments in a flight deck of an aircraft;
   determine whether the information identifier requires a user input to identify assistance information for an instrument in the group of instruments, such that when the information identifier requires the user input, a display device displays a group of actions to be performed;
   generate, using flight information displayed by the group of instruments in the image, assistance information configured to assist a flight crew; and
   display the assistance information on the display device, such that, in operation, the information identifier:
      receives from the image sensor, the image of the group of instruments in the flight deck of the aircraft;
      determines whether the information identifier requires the user input to identify the assistance information for the instrument in the group of instruments, such that when the information identifier requires the user input, the display device displays the group of actions to be performed;
      generates, using the flight information displayed by the group of instruments in the image, the assistance information that assists the flight crew.

12. The apparatus of claim 11, wherein the information identifier displays a live view of the group of instruments on the display device and display the assistance information on the live view of the group of instruments.

13. The apparatus of claim 12, wherein the live view and the assistance information are for an augmented reality view displayed on the display device.

14. The apparatus of claim 11, wherein the group of actions generate additional information needed for an analysis to generate the assistance information for the instrument selected from the group of instruments.

15. The apparatus of claim 11, wherein the group of actions is selected from at least one of:
   generating the image of a group of parameters displayed on another group of instruments, and
   changing a display in the group of instruments.

16. The apparatus of claim 11, wherein the information identifier identifies a question from the image of the group of instruments and search a group of sources for the assistance information for the question.

17. A flight assistance system comprising:
a data processing system;
a display device in the data processing system; and
a computer system comprising an information identifier configured to generate:
an image, using data from an image sensor associated with the data processing system, of a group of instruments in a flight deck of an aircraft;
a determination of whether the information identifier requires a user input to identify assistance information for an instrument in the group of instruments, and, when the information identifier requires the user input, display, on the display device, a group of actions to be performed;
the assistance information, using flight information displayed by the group of instruments in the image, configured to assist a flight crew; and
a display, of the assistance information, on the display device in the data processing system, such that, in operation, the information identifier generates:
the image, using data from the image sensor associated with the data processing system, of the group of instruments in the flight deck of the aircraft;
the determination of whether the information identifier requires the user input to identify assistance information for the instrument in the group of instruments, and, when the information identifier requires the user input, display, on the display device, the group of actions to be performed;
the assistance information, using flight information displayed by the group of instruments in the image, that assists the flight crew; and
the display, of the assistance information, on the display device in the data processing system.

18. The flight assistance system of claim 17, wherein the information identifier displays a live view of the group of instruments on the display device and display the assistance information on the live view of the group of instruments.

19. The method of claim 1, wherein generating the image comprises a static image of the flight information generated at a time prior to generating the assistance information.

20. The method of claim 1, wherein displaying the assistance information comprises removing the image of the group of instruments from the display device.

\* \* \* \* \*

UNITED STATES PATENT AND TRADEMARK OFFICE
CERTIFICATE OF CORRECTION

PATENT NO.          : 9,019,128 B1
APPLICATION NO.     : 13/898686
DATED               : April 28, 2015
INVENTOR(S)         : Geun Il Kim Page 1 of 1

It is certified that error appears in the above-identified patent and that said Letters Patent is hereby corrected as shown below:

Title page, item (72) Inventor: The spelling of the inventor's name should be "Geun Il Kim"

Signed and Sealed this
Eleventh Day of August, 2015

Michelle K. Lee
*Director of the United States Patent and Trademark Office*